Figure 1:
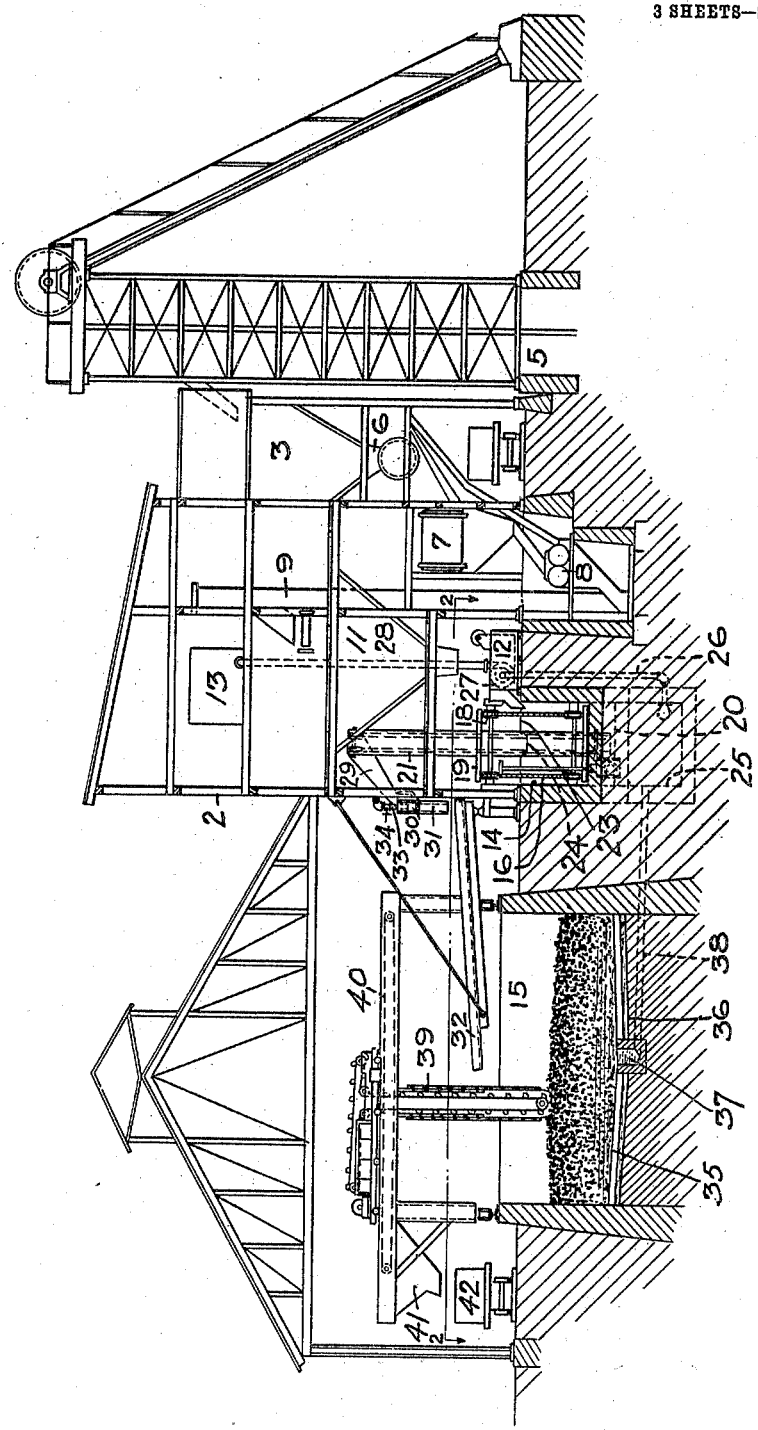

W. J. PATTERSON.
METHOD OF TREATING AND HANDLING COAL PREPARATORY TO COKING.
APPLICATION FILED OCT. 30, 1907.
948,074.
Patented Feb. 1, 1910.
3 SHEETS—SHEET 3.
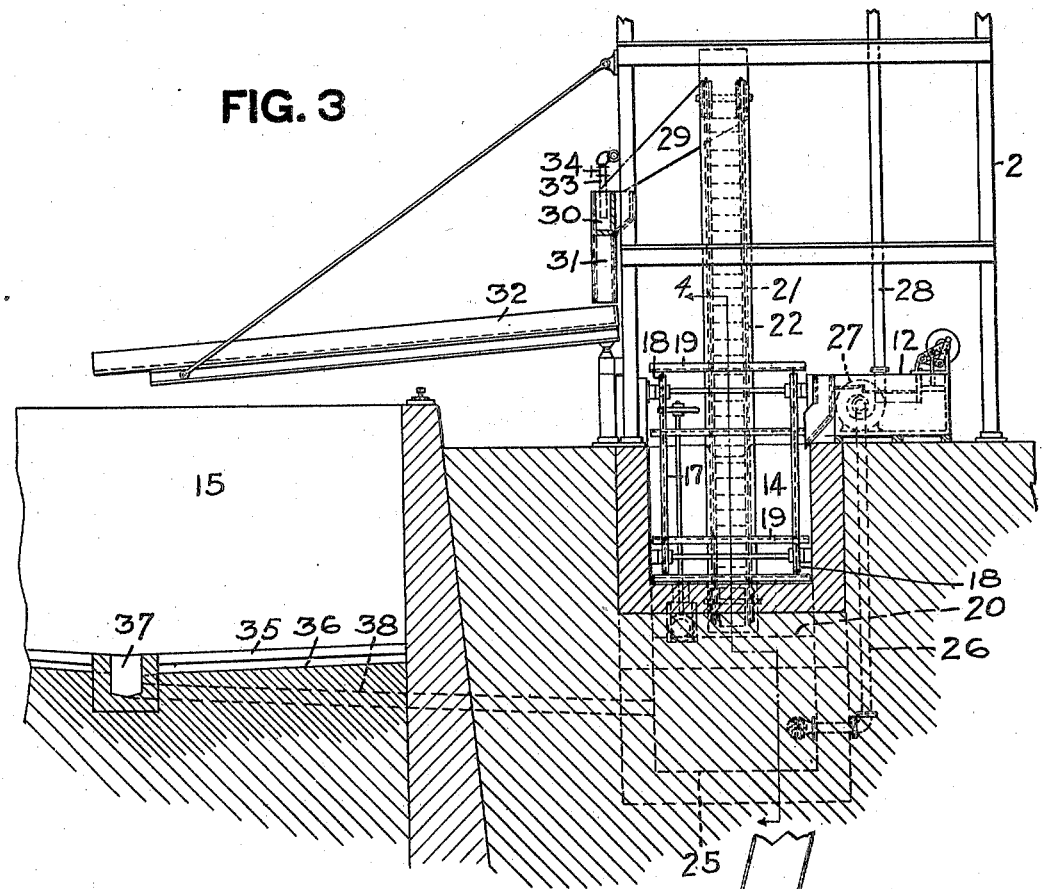
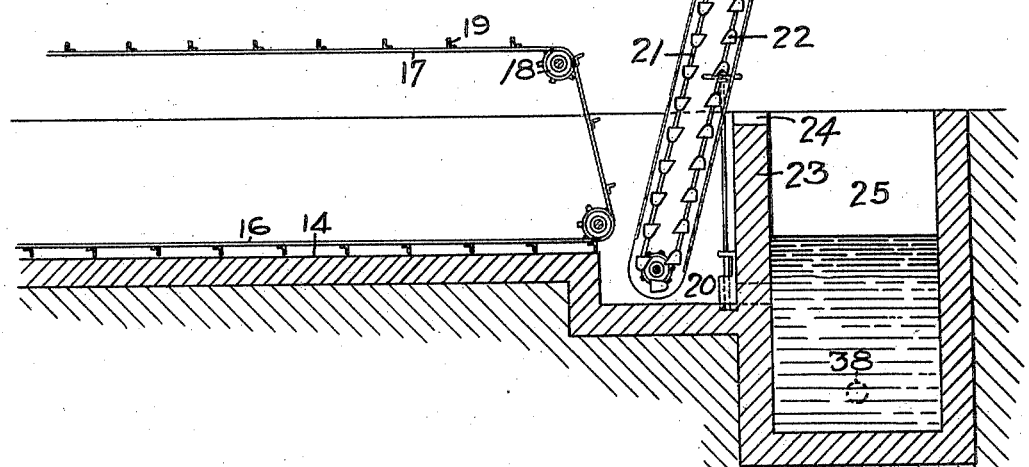
WITNESSES.
INVENTOR.

UNITED STATES PATENT OFFICE.

WILLIAM J. PATTERSON, OF PITTSBURG, PENNSYLVANIA.

METHOD OF TREATING AND HANDLING COAL PREPARATORY TO COKING.

948,074.     Specification of Letters Patent.     Patented Feb. 1, 1910.

Application filed October 30, 1907. Serial No. 399,943.

*To all whom it may concern:*

Be it known that I, WILLIAM J. PATTERSON, a resident of Pittsburg, in the county of Allegheny and State of Pennsylvania, have invented a new and useful Improvement in Methods of Treating and Handling Coal Preparatory to Coking; and I do hereby declare the following to be a full, clear, and exact description thereof.

My invention relates to a method of treating and handling coal preparatory to its being transformed into coke.

In Letters Patent of the United States granted to me September 27th, 1904, No. 770,778, for the method of treating and handling coal for coking purposes, I have set forth and claimed a method which consists essentially in storing coal and water in one entire mass directly as they come from the washers, permitting the mass so stored to remain in a substantially quiescent state until the water delivered therewith percolates down through the mass of coal, depositing the sludge throughout the mass, carrying off the water from below and removing the coal from the top of the mass. Prior to that invention the ordinary method in vogue had been to convey the coal and water through the washers to a suitable pit containing a conveyer which lifted the larger particles of the coal settling to the bottom of the pit by the use of perforated elevator buckets, so that the water was permitted to drain from the coal back into the pit as the coal was lifted by the said elevator and deposited into a bin. The water carrying the fine coal or sludge in suspension was allowed to overflow into a suitable settling tank of considerable area where, with the water in a substantially quiescent state, the dust or sludge settled to the bottom of the tank to be carried off by a conveyer running along the bottom of the tank and lifted therefrom and deposited in the bin containing the larger particles of coal already deposited therein. By this method the sludge was deposited in lumps into the coal and was not distributed evenly throughout the mass of coal. The coal and sludge remained in this bin until part of the water contained therein had drained therefrom, when through an opening in the bottom of the bin the coal was removed and discharged into the lorries below to be carried to the oven.

The object of the above recited Letters Patent was to dispense with this separation of the sludge from the larger particles of coal and discharge the water and coal directly as they came from the washers into settling tanks, allowing the water to pass down through the mass and distributing the sludge throughout the mass, the coal finally being removed from the top by suitable elevating apparatus. This process, however, if carried on under conditions where the water was greatly in excess of the coal as they come from the washers has the difficulty that the water completely submerges the coal and as the water settles the sludge held in suspension therein is deposited in the form of a blanket over the layer of coal so that when the next charge is admitted to the settling tank, the said blanket forms a practically impervious mass which prevents the percolation of the water down through the mass, while at the same time the sludge is not deposited evenly throughout the coal.

The object of my present invention therefore is to provide a method adapted to be employed in cases where the water is largely in excess of the coal as they come from the washers and at the same time provide for the proper distribution of the sludge throughout the mass when introduced into the settling tank so that the coal may be removed from the top of the mass as in the case of the above recited Letters Patent.

To these ends my invention comprises, generally stated, the method of treating and handling coal preparatory to coking, consisting in washing the coal in a quantity of water largely in excess of the coal, conveying the water and coal from the washers and confining the same, permitting the coal and sludge to settle, removing the coal and sludge, then sluicing the coal and sludge by adding water in sufficient quantity, storing the coal and water in one mass, allowing the water to percolate through the coal depositing the sludge through the mass, and finally removing the coal from the top of said mass.

Figure 2:
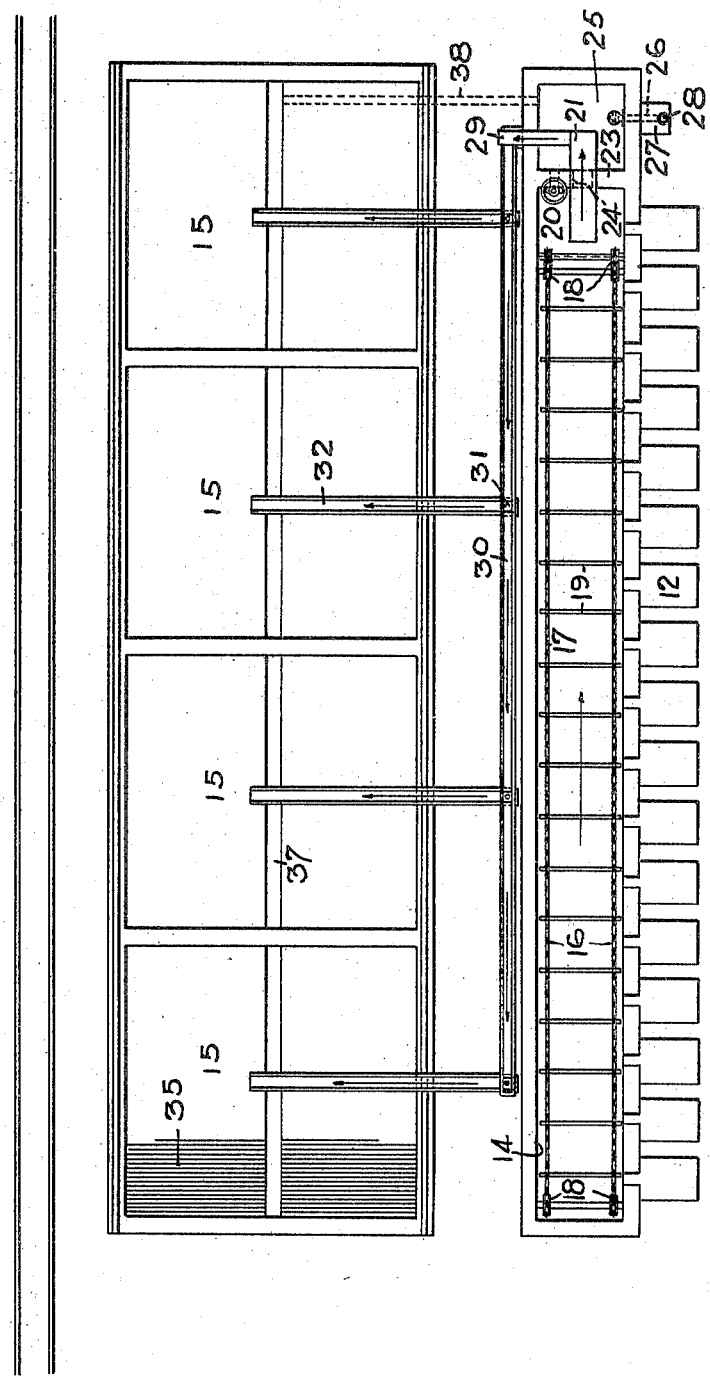

In the accompanying drawings Figure 1 is a vertical section of a plant (largely diagrammatic) suitable for carrying out my invention; Fig. 2 is a plan view of same; Fig. 3 is an enlarged sectional view of a portion of the apparatus; and Fig. 4 is an enlarged longitudinal sectional view of the overflow tank showing the elevator therein.

A suitable building is employed in which the coal is crushed and washed, which is designated by the numeral 2. Within the building is the storage bin 3 into which the coal is delivered either from the mine shaft 5 or from cars, or any other source. From this bin the coal passes down through the feeder 6 and breakers 7 and 8 which may be of the usual or any approved construction and connected in any suitable manner. From the last of these breakers an elevator 9 carries the crushed coal to the top of the building by means of which it is delivered to one of a series of bins 11. From these bins the coal will pass down into the washers 12, the water for which is supplied from a tank 13 at the top of the building. The coal washers and appurtenant mechanisms form no part of my invention and may be of any approved type, but as my invention relates to cases where the water employed in washing is largely in excess of the quantity of coal, washers of the jig type will probably be employed. From the washers 12 the coal is delivered into a settling tank 14 which is preferably arranged longitudinally of the storage bins or reservoirs 15. Within the settling tank 14 is the conveyer 16 which comprises the chains 17 traveling around the sprockets 18, said chain having the flights 19 thereon, the arrangement of the sprocket wheels being such that the flights 19 will travel very close to the bottom of the tank 14 and carry along with them the coal and sludge deposited on the bottom of said tank. At one end of the tank 14 is the pit 20 which receives the coal and sludge conveyed thereto by the flights 19 of the conveyer 16. Within the pit 20 is the elevator 21 with the buckets 22 which lift the coal from the pit 20 and carry it up therefrom. The elevator buckets 22 may be perforated so as to permit the water to drain therefrom as they rise from the tank 20. The end wall 23 of the tank 14 has the overflow outlet 24 by means of which the overflow from the tank 16 is conveyed into the pump pit 25. Connected up to the pump pit 25 is the pipe 26 connected up to the pump 27. A pipe 28 leads from the pump 27 up to the tank 13 whereby the water is pumped from the pump pit 25 up to said tank. In this manner the water used in washing is used over and over again.

The coal and sludge lifted by the buckets 22 of the elevator 21 is discharged from the said buckets into the chute 29, said chute discharging into the conduit 30 extending longitudinally of the bins 15. Leading from the conduit 30 at intervals therein are the discharge chutes 31 which deliver into the spouts 32 overhanging the bins 15. At each discharge chute 31 there is located a water pipe 33 controlled by a valve 34, said pipe leading from the tank 13. In this manner water is provided in sufficient quantities for sluicing the coal and sludge discharged by the chute 29 into the conduit 30, whereby the coal is carried along the conduit 30 and discharged through the chutes 31 into the spouts 32 whence the coal and water pass into the bins 15.

The bins 15 are provided with false bottoms 35 which may be formed of wooden strips with intervening spaces to allow for the passage of the water, which percolates down through the coal. Below the false bottoms 35 are the bottoms 36 formed of concrete or other suitable material, said bottoms sloping toward the center of the bin to the main gutter 37. A pipe 38 is connected up to the gutter 37 and conveys the water to the pump pit 25 to be raised by the pump to the tank 13.

In practicing my improved method in connection with the hereinbefore described apparatus, the coal after passing from the breakers 7 and 8 contains in addition to the fine particles of coal a great deal of dust, and this mixture of fine particles of coal and dust is carried up by the elevator and deposited by the conveyer in the bins 11. From these bins the coal is permitted to pass in suitable quantities into the washers 12 which are supplied with water from the tank 13. Some washers, and more particularly those of the jig type, require large quantities of water to wash the coal thoroughly and separate the impurities, the water sometimes exceeding the coal six or even twelve to one. The coal and the water largely in excess are delivered from the washers into the settling tank 14. The larger particles immediately settle to the bottom while the sludge or fine coal settles more slowly. The conveyer 16 with its flights 19 moving quietly along the bottom of the tank acts to remove the coal and sludge which settle to the bottom of said tank without unduly agitating the water and preventing the settling of the sludge or fine coal. The coal and sludge is in this manner deposited into the pit 20 whence it is elevated by the buckets 22 and discharged into the chute 24. The coal and sludge lifted by the elevator buckets 22 is drained of surplus water by the perforations in said buckets and when discharged into the chute 29 does not contain sufficient water to sluice the coal or convey it along the conduit 30. Accordingly, at this point the water for sluicing is admitted at intervals along the conduit by means of the pipes 33 and this water is added in sufficient quantities to properly sluice the coal without giving such excess of water as would tend to create the difficulty hereinbefore referred to, namely, the formation of a blanket of sludge in the bins 15 when the water settled therein as hereinbefore referred to. The water therefore having been introduced in proper proportion to sluice the coal, the coal and water are carried by the spouts 32 into the bins 15 and when deposited therein it will be found that the water will disappear very soon after its introduction into said bin, carrying down with it the sludge in suspension and distributing the same substantially evenly throughout the mass of coal. The water will percolate down through the coal and passing through the false bottom 35 will be conveyed into the gutter 37 and carry this by the pipe 38 to the pump pit 25. It will be found that after the bins 15 have been filled and the water allowed to drain therefrom, by means of a suitable elevator 39 the coal may be removed from the top of the mass, the elevator being of such a character as to travel across the bins so that the elevator buckets may lift the coal from all points in the mass and convey the same to the conveyer 40 whence it is conveyed to the hopper 41 to be lowered into the cars 42.

By the above method it will be apparent that in working under conditions where the water is largely in excess of the coal the coal and sludge may be removed at the same time from the settling tank, thereby dispensing with a separate tank for the settling of the sludge while at the same time the coal and sludge are sluiced with a proper amount of water so that when they are finally discharged with the added water into the storage bins there will be sufficient water to carry the sludge down through the mass, while at the same time the quantity of water can be regulated so as not to be so in excess of the coal as to form the practically impervious blanket above alluded to. By my method therefore while starting with a quantity of water largely in excess of the coal as the coal and water come from the washers I reduce the water and then supply a sufficient quantity in the storage bin, while at the same time none of the water is wasted as it is used over and over again.

What I claim is:

The method of treating and handling coal preparatory to coking, consisting in washing the coal with the water largely in excess, confining the water and coal as they come from the washers, permitting the coal and sludge to settle together, removing the coal and sludge, sluicing the coal and sludge so removed by adding clear water in sufficient quantity, storing the coal, sludge and water in one mass, allowing the water to percolate through the coal depositing the sludge throughout the mass and removing the coal from the top.

In testimony whereof I, the said WILLIAM J. PATTERSON, have hereunto set my hand.

WILLIAM J. PATTERSON.

Witnesses:
   ROBERT C. TOTTEN,
   J. R. KELLER.